United States Patent [19]

Crump

[11] Patent Number: 5,121,329
[45] Date of Patent: Jun. 9, 1992

[54] APPARATUS AND METHOD FOR CREATING THREE-DIMENSIONAL OBJECTS

[75] Inventor: S. Scott Crump, Minnetonka, Minn.

[73] Assignee: Stratasys, Inc., Minneapolis, Minn.

[21] Appl. No.: 429,012

[22] Filed: Oct. 30, 1989

[51] Int. Cl.$^5$ .............................................. G06F 15/46
[52] U.S. Cl. .............................. 364/468; 364/474.24; 364/477; 264/239; 264/25; 425/174.4
[58] Field of Search ..................... 364/472, 473, 477; 264/308, 113; 425/174.4; 427/8, 52; 164/94; 239/75, 82, 83, 84, 132

[56] References Cited

U.S. PATENT DOCUMENTS

| | | | |
|---|---|---|---|
| 1,934,891 | 11/1933 | Taylor | 239/83 |
| 3,749,149 | 7/1973 | Paton et al. | 164/94 |
| 4,071,944 | 2/1978 | Chuss et al. | 427/8 |
| 4,247,508 | 1/1981 | Housholder | 264/221 |
| 4,293,513 | 10/1981 | Langley et al. | 264/308 |
| 4,545,529 | 10/1985 | Tropecano et al. | 239/75 |
| 4,575,330 | 3/1986 | Hull | 364/473 |
| 4,595,816 | 6/1986 | Hall et al. | 364/477 |
| 4,665,492 | 5/1987 | Masters | 364/474.02 |
| 4,681,258 | 7/1987 | Jenkins et al. | 239/83 |
| 4,863,538 | 9/1989 | Deckard | |
| 4,938,816 | 7/1990 | Beaman et al. | |
| 4,944,817 | 7/1990 | Bourell et al. | |

OTHER PUBLICATIONS

Article entitled "Instant Gratification", *High Technology Business* Author–Gregory T. Pope–Jun. 1989.

Asymtek Brochure, "Benchtop Automation" May 1988.

*Primary Examiner*—Joseph Ruggiero
*Assistant Examiner*—Patrick D. Muir
*Attorney, Agent, or Firm*—Moore & Hansen

[57] ABSTRACT

Apparatus incorporating a movable dispensing head provided with a supply of material which solidifies at a predetermined temperature, and a base member, which are moved relative to each other along "X," "Y," and "Z" axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed.

Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer.

44 Claims, 3 Drawing Sheets

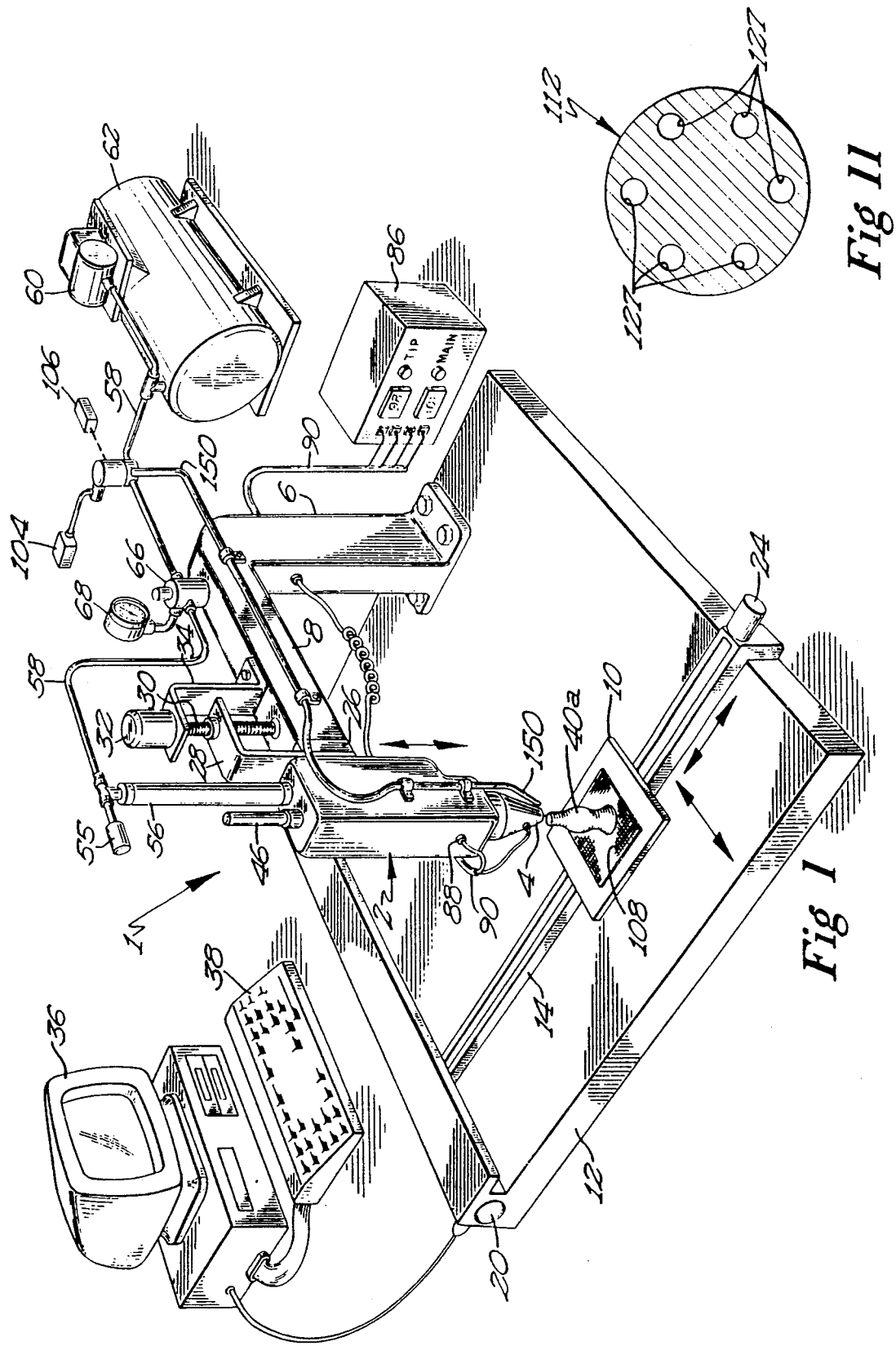

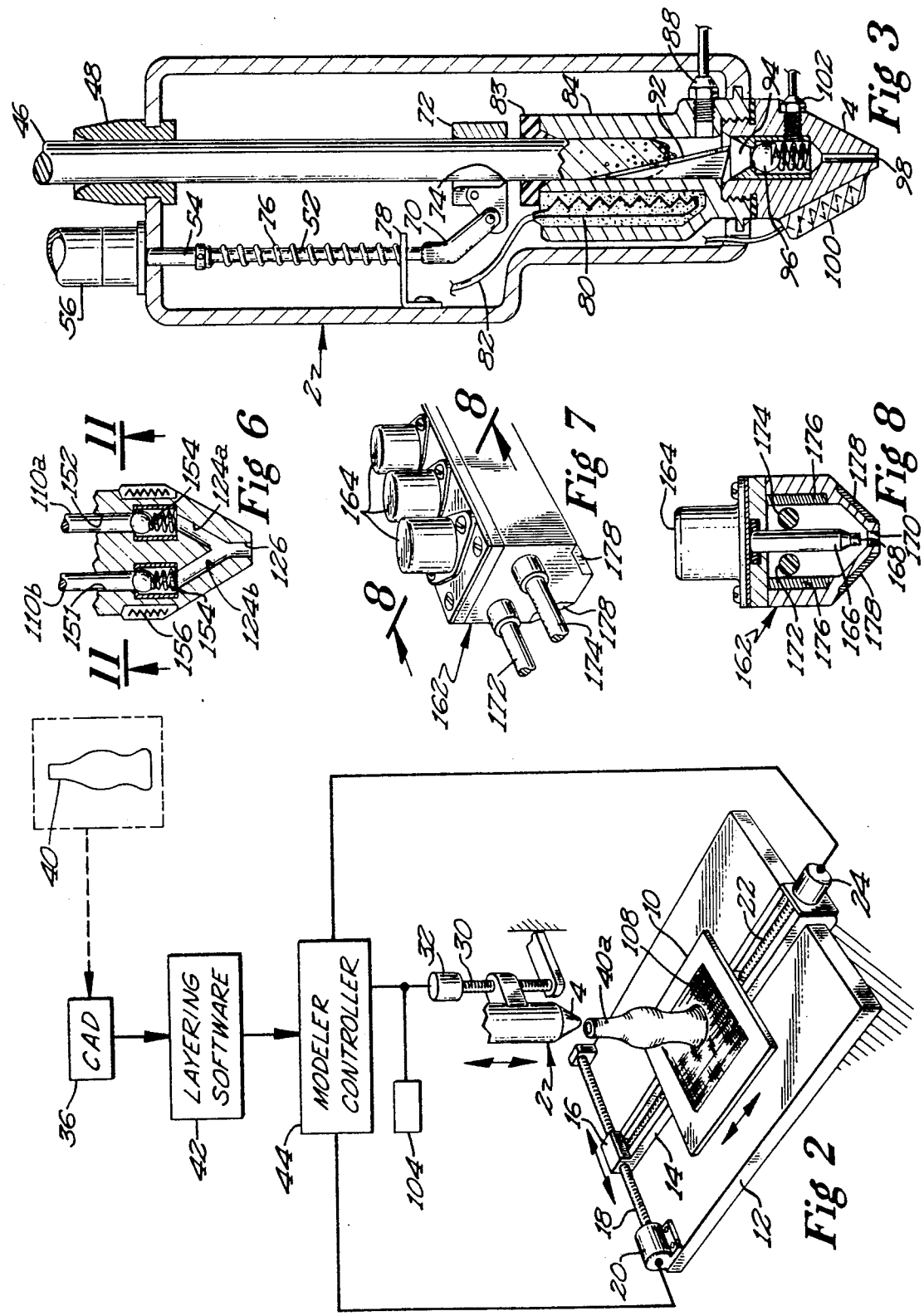

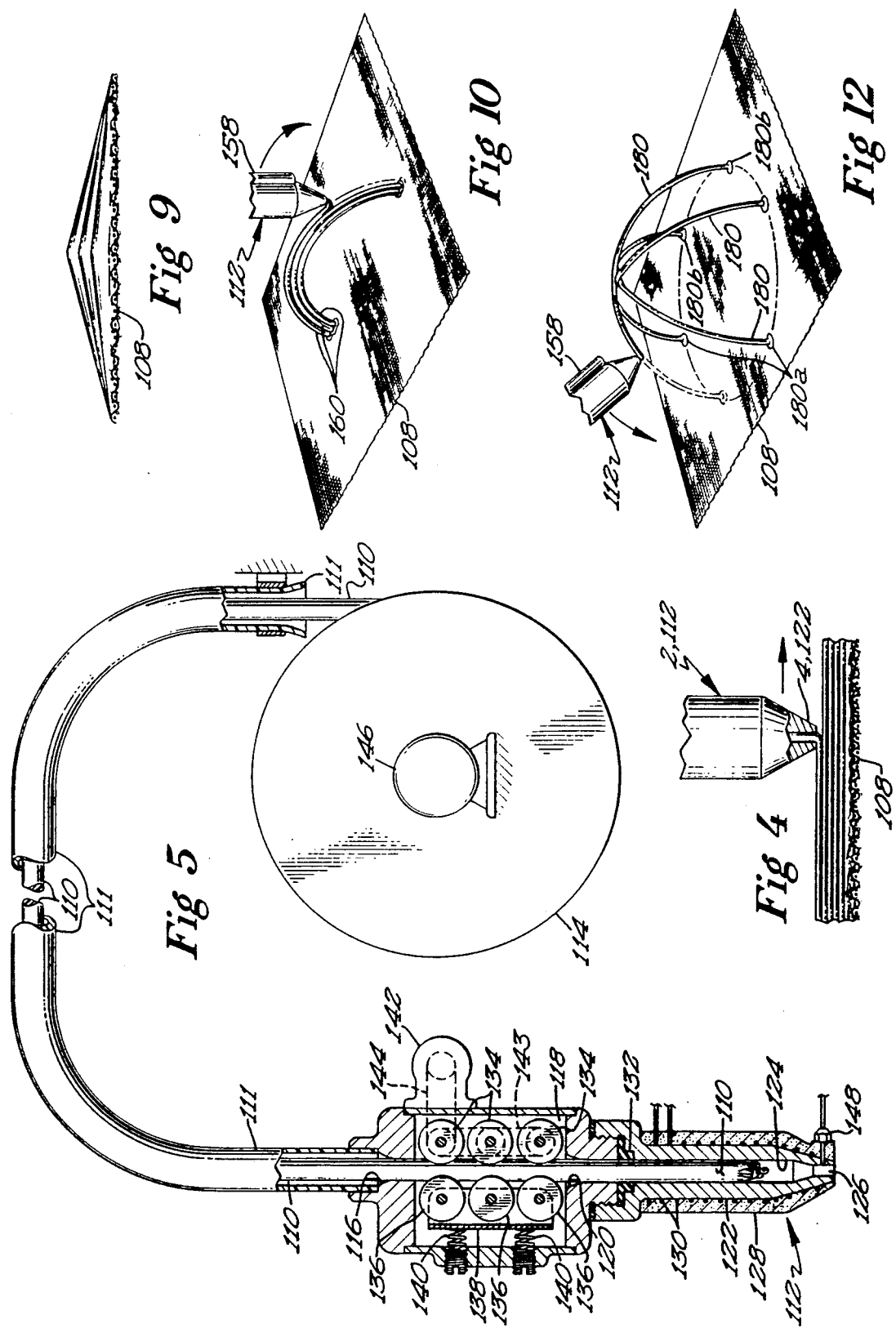

APPARATUS AND METHOD FOR CREATING THREE-DIMENSIONAL OBJECTS

BACKGROUND OF THE INVENTION

This invention relates to an apparatus and process for forming a three-dimensional object of predetermined design, and in particular to the making of a model or article by depositing multiple layers of a material in a fluid state onto a base. The material is selected and its temperature is controlled so that it solidifies substantially instantaneously upon extrusion or dispensing onto a base, with the build-up of the multiple layers forming the desired article.

Methods and techniques for making three-dimensional articles of a predetermined size and shape are known. In accordance with conventional techniques, the desired part is initially drawn, either manually or automatically utilizing a computer-aided design (CAD) procedure, with the article being ultimately formed by removing material from a block workpiece to form the desired shape in a machine operation. The machining operation may also be automatic with the utilization of a computer-aided machining (CAM) process. This costly and time consuming process is repeated multiple times to perfect the final manufacturing of a part, model, or prototype. The designer's success is often dependent upon either the interpretation or the skill of the machinist making the prototype or model. This common practice of mechanically removing material to create three-dimensional objects involves significant machining skills and machining time. Chemical machining techniques available to form objects have depth limitations and are incapable of making complex shapes. Thermal molding by injection or other molding techniques requires expensive molds and a procedure better adapted economically for large runs where reproducability is required. With respect to jewelry applications, most custom jewelry is now produced manually.

The current state of the art does embrace processes for making three-dimensional objects by building-up material in a pattern as prescribed by an article to be formed. U.S. Pat. No. 4,665,492 issued to William E. Masters discloses such a process wherein a stream of particles is ejected from a supply head and directed to the coordinates of the three-dimensional article in response to data automatically provided from a CAD system. This process requires a seed at the point of origin of the article to which the particles are initially directed. The particles impinge upon and adhere to each other in a controlled environment so as to build-up the desired article. The Masters procedure requires the use of two injection heads to achieve the desired three-dimensional article, requires a seed at the point of origin about which the article is constructed, and thus does not lend itself to the formation of successive layers of material in a predetermined pattern as a relatively simple means for building-up an article, such as a model or prototype. The Masters system builds up the article from a central seed by applying material to predetermined coordinates. Such a process presents inherent difficulties in holding close tolerances in the 0.001 inch range and without accumulative error build-up.

Processes and apparatus also exist in the prior art for producing three-dimensional objects through the formation of successive, adjacent laminae which correspond to adjacent cross-sectional layers of the object to be formed. However, known techniques of that type in the art of stereolithography require the use of a vat of liquid comprising a photocurable polymer which changes from a liquid to a solid in the presence of light. A beam of ultraviolet light (UV) is directed to the surface of the liquid by a laser beam which is moved across the liquid surface in a single plane, in a predetermined XY pattern, which may be computer generated by a CAD system. In such a process the successive layers may only be formed in a single, horizontal plane, with successive layers which solidify in the liquid vat adhering together to form the desired object. Such a process and apparatus is disclosed in U.S Pat. No. 4,575,330 issued to Charles W. Hull.

U.S. Pat. No's. 4,752,498 and 4,801,477 issued to Fudim disclose more recent methods for the production of three-dimensional objects by irradiation of photopolymers within a liquid medium. Multi-layered objects can be made in accordance with the teachings of those patents by directing photopolymer solidifying radiation directly into a desired area within the uncured photopolymer with the use of an immersed radiation guide. However, here again, such processes require the use and handling of curable photopolymer liquids which are hazardous, and do not permit the forming of ultra-thin layers of material in building up an object with a very fine and smooth surface.

U.S. Pat. No. 4,818,562 issued to Frank G. Arcella et al discloses a method form forming an article by directing a laser beam to a fusible powder which is melted by the beam and solidifies on its surface to form an object of desired shape. This process is also very expensive, and is further complicated by the required use of a gas which is directed through the powder to fluidize it. Impurities in the gas must ultimately be removed, and the gas must be recirculated or vented by the use of complex gas-handling apparatus.

Devices also exist for the manual making of models or sample articles, such as jewelry, from wax by the use of a wax dispensing gun from which the wax is dispensed in a heated, molten state. Such a wax-modeling gun is manufactured by the MATT Company, 663 Fifth Avenue, New York, N.Y. Also, glue guns, such as that manufactured by Parker Manufacturing Company of Northboro, Mass., are available for heating and dispensing adhesives in a fluid, molten state for gluing articles together. The Parker glue gun utilizes a glue stick which is heated within the gun and dispensed as a melted glue. However, neither the wax-molding gun nor the known glue guns have ever been adapted or utilized in conjunction with mechanical means through which the dispensing gun and/or a substrate may be mechanically moved with respect to each other so as to generate a predetermined, three-dimensional shape by applying successive layers of material in a predetermined pattern.

Thus, a need continues to exist for a relatively simply and efficient process and apparatus by means of which designers may design and create three-dimensional objects at office work stations. The process and apparatus disclosed herein meets that need with the same ease and simplicity of using a desk-top computer and printer, with the entire modeling process being carried out at the operator's CAD work station.

BRIEF SUMMARY OF THE INVENTION

This invention has as its primary objective the provision of a process and apparatus by means of which three-dimensional object can be created at an office work station in a very time and cost effective manner. It is anticipated that the invention will be particularly useful in the making of single prototypes or models of products so that they may be quickly made and studied by designers. Products having complicated shapes may thus be evolved effectively and efficiently through immediate observation of design errors and repeated modeling.

These basic objectives are realized by dispensing a material at a controlled rate from a dispensing head unto a substrate or base member in a predetermined pattern dictated by the shape of an article to be formed, with the material being dispensed in multiple layers which solidify and adhere to each other to build up the article. The process is controlled so that the material in the preceding layer, and in particular at least the material under the dispensing head, has solidified before additional material is applied on top of it to form a subsequent layer.

Advantageously, material is applied in a fluid state in very thin layers which adhere to the preceding layers in a multiple laminate of exceptionally smooth surface quality. The dispensing head is controllably elevated along a "Z" axis so as to sequentially form layers of material as thin as 0.0001 inches or as great at 0.125 inches in thickness. The thickness of each layer is controlled by regulating the gap between the dispensing head and the previously-formed layer.

In order to mechanically form each successive layer, drive motors are provided to selectively move the base member and dispensing head relative to each other in a predetermined pattern along "X" and "Y" axes as material is being dispensed. Relative vertical movement along a"Z" axis may also be carried out during the formation of each layer, as well as at the completion of each layer to achieve desired layer shape and thickness. Such mechanical movements are preferably achieved through drive signals inputed to the drive motors for the base member and dispensing head from a computer/controller CAD/CAM system. In such a system the design of an article to be formed is initially created on a computer, with commercially available software being utilized to convert the three-dimensional shape into multiple layer data which is transmitted as drive signals through a computer-aided machine (CAM) controller to the aforesaid drive motors. Each layer can have its own distinctive shape as controlled by the program in the CAD system, and the layers may have different thicknesses.

The article-forming material is preferably supplied to the dispensing head in the form of a flexible strand of solid material from a supply source, such as a reel. A rod of solid material may also be used as the material-supply medium on the dispensing head. In either case, the material is heated above its solidification temperature by a heater on the dispensing head and applied as a fluid. Preferably, the dispensing head includes a flow passage connected to a discharge outlet in a nozzle from which the fluid material is dispensed. The nozzle may advantageously function as a "doctor blade" acting on the surface of each layer as it is formed to closely control the thickness of each layer.

Various material, including waxes, thermoplastic resins, and metals may be used to form three-dimensional articles as described herein. The material is preferably one which will melt at a preselected temperature and rapidly solidify without shrink distortion upon adhering to the previous layer. A temperature controller responsive to temperature sensors on the dispensing head is used to closely control the temperature of the supply material to a level of about 1° C. above its solification temperature at the point of discharge. This ensures consistent flow and that the material will solidify substantially instantly upon cooling, after discharge, with resultant efficiency in the article-forming process as multiple layers are discharged, solidify, and build-up. A supplemental heater on the nozzle tip responsive to the temperature controller provides the close control of the temperature of the material as it is discharged, to ensure that it is in a fluid state slightly above its solidification temperature.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 is a perspective view showing one version of the apparatus for forming three-dimensional objects;

FIG. 2 is a diagrammatic view showing the computer-aided design system for operating the article-forming apparatus;

FIG. 3 is a vertical section view of the dispensing head of FIG. 1;

FIG. 4 is a fragmentary view showing the dispensing head applying multiple layers of material;

FIG. 5 is an elevation view of a different embodiment of the material-applying apparatus utilizing a flexible strand as the supply material;

FIG. 6 is a fragmentary, section view of a modified form of dispensing nozzle showing multiple flow passages;

FIG. 7 is a fragmentary, perspective view of a manifold type of material dispenser having multiple outlets;

FIG. 8 is a verticle section view of the manifold and valve assembly of FIG. 7;

FIG. 9 is a diagrammatic illustration showing how multiple layers of material can be built up in varying heights and thicknesses; and FIG. 10 is a diagrammatic illustration showing how material can be dispensed and formed in free space by the apparatus of this invention.

FIG. 11 is a bottom plan view of an alternative multiple orifice dispensing head as viewed along lines 11—11 of FIG. 6; and FIG. 12 is a diagrammatic illustration showing how a wire frame article can be formed by the apparatus of this invention.

DESCRIPTION OF THE PREFERRED EMBODIMENTS

Referring now to the drawings, FIG. 1 illustrates one embodiment of the apparatus of this invention for making three-dimensional articles, the apparatus being generally indicated by reference numeral 1. The apparatus includes a movable dispensing head 2 having a discharge nozzle 4 at its bottom end, dispensing head 2 being supported from a pedestal 6 by a mounting arm 8. Dispensing head 2 is located in close proximity to a base member comprising a plate 10 on which an article to be formed is built up as hereinafter set forth.

Dispensing head 2 and base plate 10 are supported for mechanical movement relative to each other. In the preferred embodiment shown, this is accomplished by providing mechanical means for translational movement of base plate 10 laterally along "X" and "Y" axes of a base plane and for vertical movement of dispensing head 2 along a "Z" axis. Accordingly, as is shown in FIGS. 1 and 2, base plate 10 is supported on an X-Y axis table 12 having a slide rod 14 in threaded engagement within its drive block 16 with a drive screw 18. A drive motor 20 provides rotary power to drive screw 18. Slide rod 14 also carries an elongated drive screw 22 driven by a second motor 24 and coupled to mating threads (not shown) secured to the underside of base plate 10 for driving engagement therewith. It will thus be seen that article-receiving base plate 10 may be moved along the X and Y axes indicated in FIG. 1 by the selected actuation of motors 24 and 20, respectively.

Separate mechanical drive means are provided for up and down vertical movement of dispensing head 2. For that purposed, head 2 is mounted for vertical movement on a micro-slide bearing 26 on one end of support arm 8 by a bracket 28. One apertured end of right angle bracket 28 is threadedly engaged with a drive screw 30. A third drive motor 32 supplies driving, rotary power to screw 30 and is mounted on support arm 8 by bracket 34 as shown. Selected actuation of reversible motor 32 thus rotates screw 30 to provide up and down vertical movement of dispensing head 2 on slide bearing 26. For that purpose, motor 32 is preferably a high resolution stepper motor. It is to be noted, however, that various types of motors could be used for drive motors 20, 24, and 32, including stepper motors, linear motors, servomotors, synchronous motors, D.C. motors, and fluid motors.

Preferably, for fully-automated operation, motors 20, 24, and 32 are computer-controlled by drive signals generated from a computer 36, by means of which a computer-aided design (CAD) can be created at a design person's work station. Support table 12 on which base plate 10 is carried is of such a size that it can be located on a desk top. Thus, by operation of the computer keyboard 38 as shown in FIG. 1, a three-dimensional article can be designed and created at a single office work station by one operator, in the manner hereinafter set forth. As is indicated schematically in FIG. 2, the design of a three-dimensional article 40 is inputted to computer 36 utilizing commercially available CAD software. The article design is sectioned into multiple layers by a commercially available software program to provide multiple-layer data corresponding to the particular shape of each separate layer. Such software programs are in commercial use for computer-aided machining (CAM) purposes, and include NC Polaris, Smartcam, and Mastercam. AUTOLISP, has been successfully used to layer AUTOCAD drawings into multiple layers or sections of specific patterns and dimensions. The layering data signals are directed to a machine controller 44 from the layering software 42 as shown diagramatically in FIG. 2. Controller 44 in turn is connected to the X, Y, and Z drive motors 24, 20, and 32, respectively, for selective acuation of those motors by the transmission of the layering drive signals.

Various materials in different forms may be used for making three-dimensional articles with the apparatus described herein. It is preferred that the material be one which is thermally solidifiable from a fluid state in which it is applied, either at room temperature or at a predetermined temperature by the use of a cooling medium. FIGS. 1 and 3 illustrate one embodiment in which the working material is supplied in the form of a solid rod 46, heated to its melting point in dispensing head 2 and dispensed from nozzle 4 as a flowable fluid.

Various material may be used for the rod, including bees wax, casting wax, machineable and industrial waxes, parafin, a variety of thermoplastic resins, metals, and metal alloys. Suitable metals include silver, gold, platinum, nickel, alloys of those metals, aluminum, copper, gold, lead, magnesium, steel, titanium, pewter, manganese bronze. Glass, and particularly Corning glass, would also be satisfactory. Materials of varying degree of transparency would be useful in forming certain objects, such as for forming windows in model buildings. Chemical setting materials, including two-part epoxys would also be suitable. Materials which have been found to be particularly suitable for making three-dimensional objects with the apparatus disclosed herein include Freeman "machineable wax" manufactured by Freeman Manufacturing and Supply of Cleveland, Ohio, "Friendly Plastic" thermoplastic manufactured by Friendly Plastic of Boulder, Colo., bismuth 153 alloy manufactured by Metal Specialties of Fairfield, Conn., and Thermoplastic Polymer No. 235-10, Specification No. 11061 sold by Ad-Tech of Hampton, N.H.

Supply rod 46 is inserted into supply chamber 50 of dispensing head 2 through a guide sleeve 48 as is best shown in FIG. 3. Various means may be utilized for advancing supply rod 46 through supply chamber 50 as material from the rod is dispensed through nozzle 4. One suitable means which has proven to be suitable for that purpose comprises a drive rod 52 which is attached as an extension to reciprocating piston 54 of a power cylinder 56. Cylinder 56 is a fluid cylinder which is preferably actuated by a supply of pressurized air through air line 58 from air compressor 60 and its receiver tank 62 in which a reservoir of compressed air is maintained. Air from the compressor/receiver 60/62 is delivered through supply line 58 and a 3-way solenoid valve 64 and a pressure-regulating valve 66 to air cylinder 56. A pressure gauge 68 is connected to the air pressure regulator 66, all as shown in FIG. 1.

Drive rod 52 is connected by a pivotal link 70 to a ratchet head 72 having one or more ratchet teeth 74 which engage supply rod 46 to advance it downwardly within supply chamber 50 of dispensing head 2 towards dispensing nozzle 4. For that purpose, a predetermined air pressure, preferably at a constant level, is maintained on top of piston 54 within cylinder 56 so as to move drive rod 52 downwardly. It will be understood that as rod 52 is moved downwardly, ratchet teeth 74 on ratchet head 72 will advance supply rod 46 downwardly within chamber 50. Drive rod 52 extend through an apertured bracket plate 78 within supply chamber 50, bracket plate 78 serving as a stop for a return spring 76 acting on the bottom of piston 54.

Supply rod 46 is heated within heating head 84 to a predetermined temperature at which it will exceed its solidification temperature and melt to a flowable, fluid form. For that purpose, a main or primary cartridge type, electric resistance heater 80 is provided within heating head 84 within supply chamber 50 of dispensing head 2. A suitable seal ring 83 is provided around the top of heating head 84. An electrical power lead 82 is connected to resistance heater 80 as shown in FIG. 3. Heater 80 is closely controlled in order to heat the solid material of supply rod 46 to a temperature slightly above its melting point, and preferably on the order of 1° C. above the melting point of the rod material. This is accomplished by the use of an electronic temperature controller 86 connected by an electrical lead or conduit 90 to a first thermocouple-sensing element 88 as shown in FIGS. 1 and 3. Thermocouple 88 is located as shown in close proximity to the supply rod 46 within heating head 84 so as to be able to sense the temperature to which the supply material is being heated. Temperature controller 86 has a main, adjustable controller as indicated in FIG. 1 which is set to a predetermined temperature to which the supply rod material is heated by resistance heater 80, in response to sensing signals received from thermocouple 88.

A heater blade 92 forming a part of the heating assembly is embedded in the supply-rod material as shown in FIG. 3 and serves to directly heat it to the predetermined temperature. At its lower end, supply chamber 50 communicates with a flow passage indicated by reference numeral 94 and extending through discharge nozzle 4 to a dispensing outlet in the form of an orifice 98 of predetermined size at the bottom end of nozzle 4. A spring-loaded ball check valve 96 is located within flow passage 94, and opens to assist in metering the outlet flow of fluid material in response to the pressure maintained on the supply rod 46 within supply chamber 50. Check valve 94 also eliminates leakage from nozzle 4 when the system is stopped, even temporarily. Supply material from rod 46, reduced to a liquid state by heater 80 upstream of flow passage 94, flows downwardly into said flow passage and into dispensing outlet 98 from which it may be discharged onto base plate 10 to form layers of material in the course of building up an article.

The size of dispensing outlet 98 may be varied for the particular application, as by using interchangeable orifice inserts in the tip of nozzle 4. Also a variable size orifice of the type employed in cameras for varying the aperture could be utilized.

It is desired to discharge the supply material in a fluid state at a temperature only very slightly above its solidification point, so that the material will solidify very rapidly upon cooling after discharge onto base plate 10. To ensure that the supply material is discharged from outlet 98 at the desired, predetermined temperature and that the material is maintained in a liquid state throughout flow passage 94, and does not solidify therein, a supplemental electric heater 100 is provided on the tip of discharge nozzle 4 adjacent to fluid passage 94. Temperature controller 86 has a second, adjustable temperature regulator for the tip heater 100 as indicated in FIG. 1. That temperature regulator receives control signals from a second sensing device in the form of a thermocouple 102 attached to nozzle 4 in close proximity to flow passage 94 near its outlet end. As is also indicated in FIG. 1, the electrical connectors for thermocouples 88 and 102 both extend through power lead or conduit 90 connected to the temperature regulators for the main heater 80 and for tip heater 100 on temperature controller 86.

As drive rod 52 moves downwardly towards the end of its rod supply stroke to bring ratchet head 72 near the position shown in FIG. 3, the piston 54 and drive rod 52 must be retracted upwardly in order that ratchet head 72 with its teeth 74 may take a new grip along supply rod 46 near its upper end. The upward and downward movement of drive rod 52 may be controlled by a limit switch within dispensing head supply chamber 50, which is activated by the downward movement of ratchet head 72 or pivotal link 70; or, alternatively, a timer 106 as shown schematically in FIG. 1 may be utilized to time the downward movement of supply rod 46 and to initiate the return of drive rod 52 at the expiration of a predetermined time interval. Either type of control device would be connected to air valve 64 so as to de-energize that solenoid valve and cut off the supply of pressurized air to the top of drive cylinder 56. When that happens, return spring 76 urges piston rod 54 back upwardly. That movement is further assisted and permitted by the use of a quick release, vent valve 55 connected to the fitting on the top of air cylinder 56 as shown in FIG. 1. When the supply of pressurized air through line 58 to air cylinder 56 is cut off by the closing of valve 64, the upward movement of piston 54 under the action of return spring 76 expels the air in the top of cylinder 56 through valve 55. At the top of the return stroke of drive rod 52, ratchet head 72 takes a new grip on supply rod 46. Air valve 64 is then re-opened at a timed interval by timer 106 to again introduce a supply of pressurized air on top of drive piston 54 within cylinder 56. The downward, supply movement of rod 46 is then reactivated. As supply rod 46 moves downwardly within chamber 50, it is heated within heating head 84 to its melting point. As a result, liquid material flows downwardly into flow passage 94 and out through dispensing outlet 98.

The opening and closing of air valve 64 to regulate the supply of pressurized air, and thus the supply of material in a fluid state through dispensing head 2 and its dispensing outlet 98 may also be accomplished by means of a relay 104 shows schematically in FIGS. 1 and 2. As is indicated in FIG. 2, relay 104 is responsive to the software layering signals directed to the drive motor 32 which provides vertical movement of dispensing head 2 along a "Z" axis. Relay 104 may thus be energized and de-energized to open and close air valve 64 in response to programmed signals indicative of upward and downward movement of dispensing head 2. As hereinafter set forth, it may be desirable when building certain types of articles to close air valve 64 and cut off the supply of material 46 when dispensing head 2 is moved upwardly to commence the formation of sequential layers a predetermined vertical distance above each previously formed layer. When the supply of pressurized air to cylinder 56 is shut off, spring-loaded check valve 96 closes flow passage 94.

With the above-described embodiment, utilizing a solid rod 46 as the source of supply material for forming an article, the metering of the material onto base plate 10 at a predetermined rate is accomplished by a combination of the preselected size of dispensing outlet orifice 98 as well as by the preselected, constant pressure maintained on piston 54 so as to control the rate at which supply rod 46 slowly advances through supply chamber 50 of dispensing head 2 as it is heated and reduced to a liquid state. The metered flow of material is also controlled by the gap or vertical height of the tip of nozzle 4 above the last layer and by the material viscosity.

Various substrates may be utilized to receive an article being formed on top of base plate 10. Relatively fine, wire mesh sandpaper 108 as shown in FIGS. 1 and 2, has been found to be particularly satisfactory for that purpose. After an article 40a is formed on the sandpaper 108, corresponding to a master article 40 to be copied as shown in FIG. 2, the sandpaper substrate or foundation may be readily peeled off of the bottom of the article without damage.

As noted above, the substrate or foundation 108 may advantageously take the form of a fine wire-mesh screen coated with sand and thus comprising an abrasive cloth, such as Norton No. 47650-4. Such "sandpaper" or abrasive cloth can be applied to base plate 10 by double-faced adhesive tape. The substrate 108 is important in avoiding localized shrinkage in the foundation layer of the article being formed and in enhancing release of the article from base plate 110 without damage. The sand particles on the substrate 108 provide particularly effective adhesion of the dispensed material. The material also flows into and imbeds in the cells or pores of the open matrix wire screen. Separation of the article can be facilitated by using a conductive wire mesh screen substrate 108 made of copper wires to which a low voltage current is applied after the article is formed. This heats the screen slightly and frees the article.

Alternatively, the wire mesh screen could be magnetized and iron particles would be mixed into the supply material to enhance adhesion of the foundation layer to the substrate 108. Interruption of a magnetic field applied to base plate 10 would permit separation of the formed article.

The substrate 108 could also be made of water-soluble wax, which could be dissolved to separate the article without damage.

FIG. 5 illustrates another version of the apparatus for dispensing supply material unto the movable base plate 10 in order to form a three-dimensional object by building up multiple layers. In this embodiment, the supply material is in the form of a flexible strand in solid form. The flexible strand, like the solid rod 46 of the embodiment of FIG. 3, is a solid material which can be heated relatively rapidly above its solidification temperature, and which will very quickly solidify upon a small drop in temperature after being dispensed onto the receiving plate 10. Any of the materials described above with respect to the embodiment of FIGS. 1 and 3 would be satisfactory. A flexible strand of thermoplastic resin, wax, or metal in the form of a flexible wire, such as a strand of bismuth, gold or silver, would be suitable. The flexible strand 110 is advanced into and through a dispensing head 112 from a supply reel 114. It is fed through a guide sleeve 111 made of a suitable low friction material such as Teflon for support in motion. Dispensing head 112 has a supply chamber 118 with an inlet aperture 116 at its upper end, and a lower guide aperture 120 through which the flexible strand is fed towards discharge nozzle 122. Discharge nozzle 122 has a threaded connection as shown to dispensing head 112 and contains a central, material supply and flow passage 124 in flow communication at its lower end with a dispensing outlet orifice 126 of predetermined size to assist in providing a metered supply of material in a fluid state. A heater 128 in the form of a sleeve containing an electric resistance heater coil 130 is positioned around discharge nozzle 122 as shown closely adjacent to the walls of nozzle 122 for heating the supply strand in passage 124. A seal ring 132 is provided around the internal surface of flow passage 124 at the inlet to discharge nozzle 122 to provide an hydraulic seal at that location.

In order to introduce the flexible strand of supply material into and through dispensing head 112, a plurality of drive rollers 134 are provided within supply chamber 118 as shown, those rollers being drivingly connected to each other as by suitable belt or chain drives 143. Rotational power is supplied to the drive rollers by a motor 142 and a drive belt or chain 144. Motor 142 may take various forms. A high resolution stepper motor is preferred. A plurality of idler rollers 136 disposed opposite drive rollers 134 cooperate therewith to grip the flexible strand 110 therebetween and to advance it through dispensing head 112 towards the dispensing outlet 126 of nozzle 122. Rollers 136 are spring biased towards rollers 134 to maintain gripping, frictional contact on flexible strand 110 by the use of springs 140 acting on a pressure plate 138, which engages rollers 136.

Supply reel 114 for the flexible strand may be freewheeling, in which case drive motor 142 is the only driving, power source for advancing flexible strand 110. In such an arrangement, motor 142 would preferably be a stepper motor. Alternatively, an additional drive motor 146 could be provided on rotary wheel 114, with motor 146 being a stepper motor to assist in controlling the advance o the flexible strand 110. With two drive motors 142 and 146 being utilized, their speeds would be closely coordinated and controlled so that they advance flexible strand 110 at the same linear rate. With either drive arrangement, sufficient slack is maintained in flexible strand 110 to permit unrestrained travel of dispensing head 112 as an article is being formed.

Flexible strand 110 is preferably of a very small diameter, on the order of 1/16th inch; however, fine, flexible wires of supply material as small as 0.001 inch in diameter may be utilized for controlled advancing through dispensing head 112. By selective control of the drive motor 142 or motor 142 in combination with motor 146, the rate of advance of flexible strand 110, and thus of the volumetric dispensing rate of the supply material onto base plate 10 can be very closely controlled. The flexible strand is heated to a predetermined temperature slightly above it solidification point by heater coil 130, within passage 124 of nozzle 122. The material is reduced to a fluid state in which it flows outwardly from dispensing outlet 126 onto the sandpaper-receiving surface 108 of base plate 10 as shown in FIG. 1. It is to be noted that the material-supply apparatus of FIG. 5 would be utilized with the same X-Y table 12 and mechanically movable base plate 10 as shown and described with respect to FIGS. 1 and 2. Dispensing head 112, like dispensing head 2, would be mounted on a support arm 8 for selective vertical movement along a "Z" axis by a control motor 32. In like manner, a CAD design system utilizing computer 36 and related software for sectioning a design article into multiple layers as shown and described with respect to FIGS. 1 and 2, would be utilized with the dispensing embodiment of FIG. 5.

With respect to either the dispensing apparatus of FIGS. 1 and 2, or the flexible strand supply apparatus of FIG. 5, the supply material is heated to a fluid state in the dispensing head and metered at a controlled flow rate onto a receiving surface, such as sandpaper 108 positioned on base plate 10. In response to drive signals from the computer 36 and the layering software 42 inputted through controller 44, the dispensing head 2 and base plate 10 are selectively moved with respect to each other in a predetermined pattern to form an article of desired shape. In the embodiment shown, base plate 10 is movable along "X" and "Y" axes with the dispensing head being movable vertically along a "Z" axis. However, it is to be understood that total, controlled movement to form the article could be achieved by moving either the base plate alone or the dispensing head alone, without moving the other.

As is indicated in FIG. 4, the supply material is dispensed in a fluid state from the dispensing head 2 or 112 through a dispensing outlet onto sandpaper 108 to form and build up multiple layers of material. Multiple passes of the dispensing head are made, with each pass taking place in a controlled pattern as dictated by the layering software 42 for multiple cross sections of the article being produced in accordance with design data inputted to computer 36. The computer and related software programs determine when the dispenser is on and off based on the original design drawing. The machine controller 44 controls the operation of drive motors 20, 24, and 32 along the "X," "Y," and "Z" axes. Each of these motors may be operating separately, or one or more of them may be operating simultaneously, depending upon the shape of the article to be formed. Circular patterns for each layer can be generated by controlled movement along the "X" and "Y" axes of the base plate 10. The dispensing head is initially positioned a predetermined height above base plate 10 or its receiving substrate 108 to form the first layer. The height of each subsequent layer is then closely controlled in order to dispense and form very thin layers. The thinner the layers, the smoother the resulting surface on the article. Layers as thin as 0.0001 inches may be formed. The layers can be formed horizontally, vertically, or in any 360° orientation to the horizontal. Depositing of the material may take place along any of the three axes. The dispensing of material may take place along only the "X" - "Y" plane, until it is advantageous to deposit in the "X" "Z" plane or the "Z" "Y" plane. Normally, the dispenser head will be mounted along the "Z" axis generally perpendicular to the receiving or base plate 10, and thus perpendicular to the "X" - "Y" plane of table 12.

When forming and building up multiple layers as shown in FIG. 4, the initial relative movement of base plate 10 and the dispensing head will be in a horizontal plane along the "X" - "Y" axes. The first layer is dispensed and solidifies as it adheres to the substrate, such as sandpaper 108. The first layer may take any shape dictated by the computer program and it solidifies substantially instantly. No material is dispensed onto a previously formed layer, until that portion of the layer under the dispensing head has solidified. The second and each subsequent layer may take slightly different shapes, as dictated by the particular cross section for each layer from the computer program and layering software. In the pattern situation for each layer wherein each layer is formed only in a horizontal "X" - "Y" plane, motor 32 is selectively actuated after each layer is formed to raise the dispensing head incrementally along the "Z" axis a closely controlled, predetermined distance to control the gap between layers and thus the thickness of each layer. After the dispensing head is thus raised, the next layer is dispensed and formed along a controlled path. In some instances, the dispensing head may be moving in a direction along the "Z" axis as the layer is formed, such as when forming a spiral pattern, and the software program will control the location of the dispensing head at the end of each layer. Thus, when at the start position for the next layer, the dispensing head may have already been raised a distance along the "Z" axis above the corresponding point on the previously-formed layer. In such a situation, the dispensing head may not have to be elevated at all at the commencement of the next layer, or it may be elevated incrementally a very small distance to form the desired gap between layers, and thus the predetermined layer thickness.

Each layer of material is dispensed in a liquid state, solidifies and adheres to the previous layer. This forms a very strong bond between layers. When utilizing a dispenser with a nozzle tip having a flat bottom surface as shown with respect to the nozzles 4 and 122 in FIG. 4, the bottom flat face of the nozzle provides a "doctor blade" effect as the nozzle and sandpaper substrate 108 are moved in an "X" - "Y" plane relative to each other. By surface contact with the layer of material as it is being dispensed, the dispenser tip limits the top of each layer to the precise "Z" axis setting, and thus assists in regulating the thickness of each layer so that no accumulated error along the "Z" axis occurs.

The multiple layers may be of uniform thickness as shown in FIG. 4, or the layers may vary in thickness, as necessary and appropriate for the forming of a particular article. Also, the layers may each vary in thickness across the height of each layer, as shown in FIG. 9. As shown in the FIG. 9 illustration, the layers formed on the sandpaper substrate 108 may vary in height along inclined surfaces, and such surfaces may either be straight or arcuate.

Feeding of the supply material is controlled relative to the "X," "Y," and "Z" movement of the base plate 10 and dispensing head in such a way that the flow of material onto the substrate 108 is not starved or unduly excessive. The main concern is the control of layer thickness, and thus of smoothness of finish. If material spills over on one layer and/or is starved on other layers, the layers will be of irregular thickness with a resulting rough wall surface on the article produced. Supply material control may be accomplished in various ways. One approach utilizes the discharge of fluid material from the nozzle orifice by the advance of a solid rod 46 under a constant, predetermined air pressure as described and illustrated with respect to FIGS. 1 and 3. This provides constant fluid pressure of the supply material at the dispensing outlet orifice 98. The advancing movement of the solid rod 46 would be at a speed initially determined by the relative movement speed of the dispensing head and base plate in the "X" "Y" plane. In the embodiment of FIG. 5, very accurate control of the volume rate of feeding of the flexible strand 110 can be achieved. This can be done by proportionally regulating the linear speed of the drive motor 142 in relation to the resultant "X" "Y" speed in the horizontal plane of the dispensing head and base plate relative to each other, as achieved by sensing the driving speed of control motors 20 and 24. Alternatively, the speed of motor 142 can be proportionally regulated in relation to the resultant "X," "Y," "Z" speed by sensing motors 20, 24, and 32. Thus, the volumetric flow rate of the supply material in a fluid state as discharged from dispensing head 112 would be controlled in a proportional relation to the "X" - "Y" speed of the dispensing head and base plate 10 relative to each other. This can be done by sensing the pulse signals driving motors 20 and 24, and sending proportional pulse drive signals to drive motor 142 on dispensing head 112.

The material supply apparatus of FIG. 5, using a flexible strand of very small, predetermined diameter, permits very accurate control over the volume flow rate of dispensing of the material. Effective on/off fluid dispensing can be achieved by simply stopping the advancing motors. This might be done, for example, when tracing a pattern which includes corners. To avoid puddling or excessive build-up of the supply material at the corners of a pattern, when there is no relative movement between the dispensing head and the base plate along the "X" - "Y" plane, the interruption of the drive signals to motors 20 and 24 can also be used to provide a stop signal to the drive motor(s) for advancing flexible strand 110.

Alternatively, the "X" - "Y" drive motors 20 and 24 can be driven at a constant speed, without interruption. Such a speed would be selected to correspond to the slowest speed required to form patterns, such as around corners, where a relatively slow output feed of dispensing material would be required. The flexible strand 110 of FIG. 5 would be advanced at a constant linear rate by controlling the strand drive motors to correspond proportionally with such a constant speed movement of a dispensing head and base plate relative to each other in the "X" - "Y" plane. This approach to volume rate control of the supply material simplifies the control operation, but would necessitate a greater length of time for building up the article in desired layers. As noted above, the use of a flexible strand as the supply material in the dispensing head apparatus shown in FIG. 5 does permit close control of the dispensing of the supply material in a liquid state. The flexible strand 110 is of such a small diameter and of resulting small mass, that as it is heated in dispensing head 112, there is substantially minimal accumulation of supply material in a liquid state at the dispensing outlet 126. Thus, positive cut-off of the linear advancing movement of strand 110 substantially cuts off liquid material dispensing from the head 112. The flow of supply material may need to be interrupted in such a manner when moving the dispensing head vertically upwardly a predetermined distance along a "Z" axis after forming each layer, and prior to dispensing material in the next layer. Continued material flow from the dispensing head during such incremental vertical movement along the "Z" axis of the dispensing head could result in excessive accumulation of material on the preceding layer at a particular point.

The close control of the temperature to which the flexible strand 110 is heated in dispensing head 112 also assists in regulating its flow at a desired outlet temperature. For this purpose, a thermocouple 148 as shown in FIG. 5 may be located in close proximity to the internal passage 124 of nozzle 122, with thermocouple 148 being used in conjunction with a temperature controller 86 as described above with respect to FIG. 1, for the purpose of closely regulating the temperature of electric resistance heating element 130.

Preferably, the supply material utilized will have a solidification temperature permitting it to solidify substantially instantaneously at room temperature in which it is dispensed. For example, thermoplastic resin deposited in relatively thin layers less than 0.001 inch in thickness solidifies substantially instantaneously upon being dispensed at room temperature. If thicker layers of thermoplastic are to be formed, on the order of 0.020 inch, then a cooling medium, such as air, water, or freon may have to be utilized on or in conjunction with base plate 10 so as to cool the thermoplastic resin rapidly as it is dispensed in order to ensure that it will immediately solidify. Cooling medium application must be controlled. Over cooling can cause shrink distortion. The nature and extent of cooling medium application for the purpose of rapidly solidifying the dispensed material will depend upon the nature of the material used. For example, wax will cool and solidify substantially instantaneously in thin layers. In one working embodiment as shown in FIG. 1, compressed air supplied from compressor 60 and its receiving tank 162 was provided through a separate supply line 150, with its discharge end positioned closely adjacent the tip of discharge nozzle 4, as shown in FIG. 1. The cooling air from line 150 assisted in rapidly solidifying the wax as the multiple layers were formed.

Different structures and arrangements of dispensing heads may be utilized for receiving and dispensing different types and/or different colors of dispensing material from separate sources. For example, as shown in FIG. 6, the dispensing head 112 may have multiple supply chambers 151 and 152 into which different supply materials 110*a* and 110*b* may be directed from separate supply sources. The supply materials 110*a* and 110*b* could be flexible strands supplied from a reel in the manner described and shown with respect to FIG. 5, or they could be in the form of rods as illustrated at 46 with respect to FIG. 1. In either case, different materials could be supplied and alternately melted by a resistance heater 156 on the dispensing head for flow through check valves 154 into alternate flow passages 124*a* and 124*b*. As shown in FIG. 6, both of those passages communicate with a single discharge outlet or orifice 126 on the tip of nozzle 122. Thus, with such an arrangement on the dispensing head, different materials, such as thermoplastic resins and wax could be utilized to form different layers of the same article. Also, the supply materials 110*a* and 110*b* could be provided in different colors in order to form alternate or different layers of different colors in the object being created. For example, material 110*a* could be in the form of a red wax, and material 110*b* could be in the form of a blue plastic.

As shown in FIG. 11, a plurality of dispensing orifices 127 could also be arranged in a circular pattern on a dispensing head 112. The dispensing head would be of the same basic construction as shown in FIG. 6 with multiple supply passages 151, 152, etc., into which multiple rods or flexible strands of different compositions and colors of materials may be directed. However, the bottom of the dispensing head would terminate at section line 11—11 along which FIG. 11 is viewed. Thus material would be dispensed through separate orifices 127 at the outlet of each check valve 154. Such a discharge head construction would expedite set-up time and also permit discharge of material from any desired number of orifices by selective control of the separate supply materials. The user can draw from particular material and color supplies for purposes of the particular article being made and for different layers within each article. It is contemplated that chemical setting materials, such as two-part epoxy compositions could be applied by using the applicator as described with respect to FIG. 11. The two components would be discharged through separate, aligned orifices 127 so as to mix together.

Also, as illustrated in FIG. 10, it is contemplated that thermally solidifying material could be dispensed into free space so as to be suspended above a base plate or substrate 108 to which it is bonded at selected locations. For this purpose, a dispensing head 112 would have an ultrasonic vibrator or horn 158 secured to its outlet end or dispensing tip as shown. Material would be supplied to the dispensing head 112 as a solid, and heated to a fluid or a liquid state by the use of a heating element such as that disclosed at 130 with respect to FIG. 5. Ultrasonic energy is then applied by means of the electrosonic vibrator 158, and the material is dispensed at a temperature slightly below its ambient solidification temperature, the energy supplied by ultrasonic vibration serving to increase the pressure and keep the material in a fluid state as it is discharged from dispensing outlet 126. Since the material is dispensed at a temperature below its solidification temperature, it will solidify instantaneously upon discharge. This technique can be utilized to form a pattern of material in threads, struts, or strands in free space, above substrate 108 as shown in FIG. 10. Each strand of material would be initially discharged onto the substrate for attachment to it. Thereafter, various patterns of the material could be formed in the free space above the substrate as shown in arcuate form, with the material strands being secured in a cantilevered fashion at their opposite ends to substrate 108. Strands of material 160 formed and solidified in free space in a layered fashion are shown in FIG. 10.

The dispensing tip with an ultrasonic vibrator can also be used to create three-dimensional objects without laminations. For example, wire frame objects comprised of multiple, free-standing strands 180 defining wire frame segments anchored to a substrate 108 at spaced locations 180a and 180b could be formed as shown in FIG. 12. Each strand 180 instantaneously solidifies in space as it is dispensed from nozzle 112, with the nozzle and substrate being moved relative to each other in a predetermined pattern along "X," "Y," and "Z" axes by computer-driven control motors. When forming strands in an arcuate shape as shown in FIG. 12, the nozzle 112 could be canted to an angle from the vertical "Z" axis generally perpendicular to lines tangent to the arc being formed. Thus a wire frame created CAD drawing can be directly translated into a wire frame, three-dimensional object. For the object shown in FIG. 12 the strands are anchored at two points and also to each other where they intersect. Cantilevered strands and objects can also be formed with each strand anchored at only one point on the substrate. Thin strands of material can be solidified as wire frames in free space to create hollow or open articles, including those of a spider web configuration or hollow, single piece spheres.

With respect to the embodiments of FIGS. 10 and 12, the ultrasonic vibrator could alone be the means of fluidizing the material, with no heater being used. Instantaneous solidification of the material, even in free space, can also be accomplished by the use of a coolant such as Freon applied to the material as it is discharged from nozzle 112.

It is also contemplated that the dispensing heads may be connected to outlet manifolds incorporating a plurality of dispensing outlets or orifices. Such a dispensing arrangement would be useful for forming a wide swath in multiple layers in a paint brush type of layering effect. FIGS. 7 and 8 show a multiple orifice discharge manifold 162 which would be suitable for such purposes. Positioned along the length of the manifold 162 are a plurality of solenoid actuators, each having a connected plunger 166 with a bottom tip valve element 168 positioned in close, operating relation to a dispensing outlet or orifice 170. The controllers 164 could be electrically actuated solenoids, or they could be air actuators connected to a supply source of pressurized air, in a manner as is commonly utilized with air actuated valves. Material supply rods or strands 172 and 174 may be introduced lengthwise inside of manifold 164 as illustrated in FIGS. 7 and 8. Main, electric resistance strip heaters disposed lengthwise along the internal wall surfaces of manifold 162 serve to initially heat and liquify the solid supply materials 172 and 174; and separate strip heaters 178 mounted on the outside surface of the bottom of the manifold adjacent to outlet 170 serve to closely control the temperature of the liquified material to a level just slightly above its solidification temperature. It will be appreciated that manifold 162 can be moved in a linear path across a receiving substrate so as to apply a wide swath of material for building up a relatively large object.

The multiple-dispensing orifice approach may also be used with the flexible strand supply arrangement of FIG. 5. For that purpose, feed rollers 134, 136 would be elongated along their rotational axes to grip and advance a plurality of flexible strands 110 supplied from a plurality of separate supply reels 114. Each strand would be advanced into a separate nozzle 122.

In addition to the material supply arrangements describe above, the material could also be supplied to a dispensing head as a liquid from a liquid storage vessel using a fixed or variable displacement pump. For example, a multiple part, chemically hardening, epoxy compound could be used as the article-forming material, with each of the epoxy components being supplied as a liquid from a separate supply source to a multiple-passage dispensing head.

It is anticipated that various changes and modifications may be made in the construction and operation of the apparatus disclosed herein for forming three-dimensional objects, as well as in the methods disclosed for forming such objects, without departing from the spirit and scope of the invention as set forth in the following claims.

What is claimed is:

1. Apparatus for making three-dimensional physical objects of a predetermined shape by sequentially depositing multiple layers of solidifying material on a base member in a desired pattern, comprising:

a movable head having flow-passage means therein connected to a dispensing outlet at one end thereof, said outlet comprising a tip with a discharge orifice of predetermined size therein;

a supply of material which solidifies at a predetermined temperature, and means for introducing said material in a fluid state into said flow-passage means;

a base member disposed in close, working proximity to said dispensing outlet of said dispensing head; and mechanical means for moving said dispensing head and said base member relative to each other in three dimensions along "X," "Y," and "Z" axes in a rectangular coordinate system in a predetermined sequence and pattern and for displacing said dispensing head a predetermined incremental distance relative to the base member and thence relative to each successive layer deposited prior to the commencement of the formation of each successive layer to form multiple layers of said material of predetermined thickness which build up on each other sequentially as they solidify after discharge from said orifice; and means for metering the discharge of said material in a fluid stream from said discharge orifice at a predetermined rate onto said base member to form a three-dimensional object as said dispensing head and base member are moved relative to each other.

2. Apparatus as defined in claim 1 wherein:
said means for introducing said material in a fluid state comprises heating means disposed in close proximity to said flow passage means to maintain said material at a temperature above its solidification temperature in said flow passage means and at said discharge orifice.

3. Apparatus as defined in claim 2 wherein:
a temperature controller is connected to said heating means and temperature-sensing means is positioned on said dispensing head adjacent to said dispensing outlet, said sensing means being connected to said temperature controller, whereby said temperature controller is operative to closely regulate said heating means and thus to accurately control the temperature of said material.

4. Apparatus as defined in claim 2 wherein:
said supply of material is in solid form; and
further including a material-advance mechanism operatively associated with said solid material to advance said material through said supply chamber towards said flow-passage means, said heating means serving to melt said solid material to a flowable, fluid state.

5. Apparatus as defined in claim 4 wherein:
said supply of solid material is in the form of a rod, and said material advance mechanism is in the form of fluid under pressure connected to power-advance means coupled to said rod.

6. Apparatus as defined in claim 5 wherein:
said rod is between 0.40 inches and 0.50 inches in diameter.

7. Apparatus as defined in claim 2 wherein:
said material is in the form of a continuous flexible strand; and
further including material advance means operatively associated with said strand for the controlled advance of said strand of material through said supply chamber toward said flow passage means, said heating means serving to melt said flexible strand to a flowable, fluid state.

8. Apparatus as defined in claim 7 and further including:
a supply reel on which said flexible strand is wound, and said material-advance means comprises means for engaging said strand and pulling it from said reel.

9. Apparatus as defined in claim 7 wherein:
said flexible strand is a thermoplastic resin.

10. Apparatus as defined in claim 1 wherein:
said base member is supported for translational movement along "X" and "Y" axes in a horizontal plane; and
said mechanical means comprises motor means operative to selectively move said base member along said "X" and "Y" axes.

11. Apparatus as defined in claim 1, and further comprising:
a computer-aided design computer programmed to crease a three-dimensional drawing of a desired object or model, and software associated with said computer operative to convert the drawing into multiple elevation layer data; and
a three-dimensional controller electronically linked to said mechanical means and operative to actuate said mechanical means in response to "X," "Y," "Z" axis drive signals for each layer received from said computer.

12. Apparatus as defined in claim 1 wherein:
said material is a thermoplastic resin.

13. Apparatus as defined in claim 1 wherein:
said material is a wax.

14. Apparatus as defined in claim 1 wherein:
said material is a metal.

15. Apparatus as defined in claim 1 wherein:
a substrate having a sand particle-receiving surface is positioned on said base member, whereby the first layer of said material discharged from said dispensing outlet is received on and hardens to a solid on said sand particle-receiving surface 16. Apparatus as defined in claim 1 wherein:
an open matrix substrate is positioned on said base member, whereby the first material discharged from said dispensing nozzle is received on and hardens to a solid on said open matrix substrate 17. Apparatus as defined in claim 16 wherein:
said open matrix substrate is a fine, wire mesh screen.

18. Apparatus as defined in claim 17 wherein:
said wire mesh screen has sand particles thereon.

19. Apparatus as defined in claim 17 wherein:
said open matrix substrate is electrically conductive.

20. Apparatus as defined in claim 1 wherein:
said material includes magnetic particles and said base member has a magnetized surface thereon to attract said particles to said surface.

21. Apparatus as defined in claim 1, and further including:
a plurality of dispensing outlets in a fluid-flow communication with said flow-passage means; and
a separate flow-regulating valve in fluid-flow control relation to each of said dispensing outlets.

22. Apparatus as defined in claim 1 wherein:
said flow passage means comprises a plurality of flow passages communicating with a single discharge orifice; and
a plurality of separate supply materials supported in input relation to each of said flow passages on said dispensing head.

23. Apparatus as defined in claim 1 wherein:
the size of said dispensing outlet is variably adjustable.

24. Apparatus as defined in claim 1 and further including:
substrate having a plurality of small openings therein positioned on said base member, whereby the first material discharged from said dispensing nozzle is received on and anchored to said substrate as said material hardens to a solid.

25. Apparatus as defined in claim 1 wherein:
said tip has a bottom surface positioned by said mechanical means in contact with the material being discharged as said dispensing head and base member move relative to each other in the course of forming each layer to assist in controlling layer thickness.

26. Apparatus as defined in claim 1 wherein:
said material has solid particles entrained therein as discharged in said liquid stream.

27. A process for making a three-dimensional article comprising:
introducing a supply of thermally solidifiable material in a fluid state into a flow passage of a discharge nozzle on a mechanically moveable dispensing head, said nozzle having a dispensing outlet at one end thereof in fluid-flow communication with said flow passage;

dispensing said material from said dispensing outlet as a continuous, flowable fluid stream at a predetermined temperature above the temperature at which it solidifies onto a base member positioned in close proximity to said nozzle;

simultaneously with the dispensing of said material onto said base member, mechanically generating relative movement of said base member and said dispensing head with respect to each other in a predetermined pattern to form a first layer of said material on said base member; and displacing said dispensing head a predetermined layer thickness distance from said first layer, and after the portion of said first layer adjacent said nozzle has cooled and solidified, dispensing a second layer of said material in a fluid state onto said first layer from said dispensing outlet while simultaneously moving said base member and said dispensing head relative to each other, whereby said second layer solidifies upon cooling and adheres to said first layer to form a three-dimensional article; and forming multiple layers of said material built up on top of each other in multiple passes by repeated dispensing of said material in a fluid state from said dispensing outlet as said base member and said dispensing head are moved relative to each other, with said dispensing head and said base member being displaced a predetermined distance after each preceding layer is formed, and with the dispensing of each successive layer being controlled to take place after the material in the preceding layer immediately adjacent to said nozzle has solidified.

28. The process of claim 27 wherein:
said dispensing head and said base member are displaced a distance not greater than 0.002 inches after each of said passes to thereby build up very thin multiple layers of said material forming a three-dimensional article.

29. The process of claim 27 wherein:
said dispensing head and said base member are displaced a distance between 0.0001 inches and 0.125 inches after each of said passes.

30. The process of claim 27 and further including:
introducing said material in a solid state into said dispensing head, and heating said material in said dispensing head to a temperature above its solidification temperature, and controlling the temperature of said material within a range of plus or minus one degree centigrade of said temperature.

31. The process of claim 30 wherein:
said material is introduced into said dispensing head as a flexible strand from a source of supply thereof.

32. The process of claim 27 wherein:
said base member has a substrate thereon which is heat conductive and onto which the material is dispensed, and further including heating said substrate after said article is formed to facilitate separation of the article from the base member.

33. The process of claim 27 wherein:
said base member has an electrically conductive substrate thereon onto which said material is dispensed, and further including passing an electric current through said substrate after the article is formed to generate heat and thereby assist in separating the article from said base member.

34. The process of claim 27 wherein:
said material is selected from the group comprising aluminum, bismuth, pewter, copper, gold, silver, lead, magnesium, nickel, platinum, steel, titanium, and plutonium.

35. The process of claim 27 and further including:
controlling the volumetric rate at which said material is introduced into said discharge nozzle proportionally in response to the resultant "X," "Y" speed of the dispensing head and base member relative to each other, whereby the flow of material from said dispensing outlet will be at a proper volumetric rate to control material build-up in forming an article.

36. A process for making a three-dimensional article comprising:
creating a drawing of a three-dimensional article on a computer in a computer-aided design process wherein the drawing comprises a plurality of segments defining said article;

generating programmed signals corresponding to each of said segments in a predetermined sequence;

dispensing a solidifiable material in a fluid state from a dispensing head at predetermined conditions such that said material will solidify substantially instantaneously at ambient conditions into which said material is dispensed;

simultaneously with the dispensing of said material, and in response to said programmed signals, mechanically generating relative movement between said head and a base member positioned in close proximity thereto in a predetermined sequence and pattern of multiple movements along a plurality of axes of a rectangular coordinate system such that at least a portion of the dispensed material is deposited on and anchored to said base member, said material being dispensed in free space as a plurality of upstanding segments sequentially formed so that the last dispensed segment overlies at least a portion of the preceding segment in contact therewith to thereby form a three-dimensional article of predetermined design anchored to said base member.

37. The process of claim 36 wherein:
said upstanding segments are each dispensed and formed to be anchored to said base member at spaced-apart locations thereon and to intersect each other to define said article as a wire frame network.

38. The process of claim 36 wherein:
said material is a thermally solidifiable material; and
ultrasonically vibrating said material in said dispensing head to thereby pressurize said material and lower its solidification temperature; and
cooling said material to a temperature just below its ambient solidification temperature prior to discharge from said dispensing head, whereby said material solidifies instantaneously upon discharge from said nozzle into ambient conditions in the absence of the energy imparted to it by said ultrasonic vibration.

39. A process for making a three-dimensional article comprising:
dispensing a solidifiable material in a fluid state from a dispensing head having a tip with a discharge orifice therein, said tip having a substantially planar bottom surface, said material being one of which will solidify at ambient conditions;

maintaining a predetermined gap distance between said planar bottom surface of said tip and a base member positioned in close proximity thereto, with said material being dispensed onto said base member;

simultaneously with the dispensing of said material onto said base member, generating relative movement between said base member and said dispensing head in the plane of said base member to form a first layer of said material on said base member; and displacing said dispensing head a predetermined distance with respect to said first layer, and then dispensing a second layer of said material in a fluid state onto said first layer form said discharge orifice while generating relative movement between said base member and said dispensing head in the plane of said base member, with said planar bottom surface of said tip being maintained substantially parallel to said first layer and to the plane of said base member, whereby said tip planar bottom surface provides a shearing effect on the top surface of said second layer of material as it is dispensed to thus closely control the absolute location of successive layers with respect to the base member and to avoid any accumulative error in layer build-up, and to maintain a smooth layer surface.

40. The process of claim 39 wherein:
said material is a multiple component composition comprised of material components which react with each other.

41. Apparatus as defined in claim 39 wherein:
said substrate is a fine, wire mesh screen.

42. Apparatus as defined in claim 47 wherein:
said wire mesh screen has sand particles thereon.

43. Apparatus for making three-dimensional, physical objects of a predetermined shape by depositing solidifying material on a base member in a desired pattern comprising:
a dispensing head having means to hold a supply of material and to dispense such material in a fluid state;
a base member disposed in close, working proximity to said dispensing head;
an open matrix substrate on said base member;
means for moving said dispensing head and said base member relative to each other in a predetermined sequence and pattern of movement simultaneously with the discharge of fluid material onto said substrate commencing with the initial discharge of material onto said substrate, whereby the first material dispensed from said dispensing head is receive on and hardens to a solid on said open matrix substrate to thereby firmly anchor the article being formed.

44. Apparatus for making three-dimensional physical objects of a predetermined shape by sequentially depositing multiple layers of solidifying material on a base member in a desired pattern, comprising:
a movable dispensing head having flow-passage means therein connected to a dispensing outlet at one end thereof;
a supply material which solidifies at a predetermined temperature, and means for introducing said material in a fluid state into said flow-passage means;
a base member disposed in close, working proximity to said dispensing outlet of said dispensing head;
mechanical means for moving said dispensing head and said base member relative to each other in three dimensions along "X," "Y," and "Z" axes in a rectangular coordinate system in a predetermined sequence and pattern;
means for metering the discharge of said material in a fluid state from said dispensing outlet at a predetermined rate onto said base member to form a three-dimensional object as said dispensing head and base member are moved relative to each other;
said dispensing head comprising a supply chamber communicating with said flow-passage means and containing a supply of said material upstream of said flow-passage means in the direction of material movement toward said dispensing outlet, and a discharge nozzle having said fluid passage means therein, said dispensing outlet being at the tip of said nozzle; and
heating means on said dispensing head controlled to heat said material to a temperature above its solidification temperature, said heating means comprising a first, main heater adjacent to said supply of material in said supply chamber and second heater on said nozzle adjacent to said flow passage means, said second heater serving to maintain said material at a temperature above its solidification point in said flow-passage means and at said dispensing outlet.

* * * * *